United States Patent
Suzuki

(10) Patent No.: US 9,584,676 B2
(45) Date of Patent: *Feb. 28, 2017

(54) INFORMATION PROCESSING APPARATUS AND CONTROL METHOD THEREFOR

(71) Applicant: CANON KABUSHIKI KAISHA, Tokyo (JP)

(72) Inventor: Ayumi Suzuki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/310,559

(22) Filed: Jun. 20, 2014

(65) Prior Publication Data
US 2014/0300762 A1    Oct. 9, 2014

Related U.S. Application Data

(63) Continuation of application No. 13/358,563, filed on Jan. 26, 2012, now Pat. No. 8,804,007.

(30) Foreign Application Priority Data

Feb. 4, 2011 (JP) .................. 2011-023245

(51) Int. Cl.
*H04N 1/00* (2006.01)
*H04N 1/32* (2006.01)
*H04N 5/225* (2006.01)

(52) U.S. Cl.
CPC ...... *H04N 1/00127* (2013.01); *H04N 1/32106* (2013.01); *H04N 5/225* (2013.01);
(Continued)

(58) Field of Classification Search
CPC .................. H04N 5/23293; H04N 2201/3253
(Continued)

(56) References Cited

U.S. PATENT DOCUMENTS

| | | | |
|---|---|---|---|
| 6,542,824 B1 | 4/2003 | Berstis | 701/220 |
| 6,871,004 B1 * | 3/2005 | Bando | 386/201 |

(Continued)

FOREIGN PATENT DOCUMENTS

| | | |
|---|---|---|
| GB | 2 421 653 A | 6/2006 |
| JP | 2006-279266 A | 10/2006 |

(Continued)

OTHER PUBLICATIONS

Wikipedia—Control Unit, downloaded from https://en.wikipedia.org/wiki/Control_unit on Jun. 12, 2015.*

*Primary Examiner* — Timothy J Henn
(74) *Attorney, Agent, or Firm* — Fitzpatrick, Cella, Harper & Scinto

(57) ABSTRACT

There is provided an information processing apparatus comprising: a storage unit configured to store log data, which indicate locations along a path of movement, and image data, wherein the log data contains a plurality of pairs of position information and time information and wherein the image data contains time information and position information indicating a position where an image is captured; and a generation unit configured to generate interpolated log data which contains the plurality of pairs contained in the log data and the pair of position information and time information contained in the image data.

18 Claims, 16 Drawing Sheets

(52) U.S. Cl.
CPC ............... *H04N 2201/0084* (2013.01); *H04N 2201/3214* (2013.01); *H04N 2201/3215* (2013.01); *H04N 2201/3253* (2013.01)

(58) Field of Classification Search
USPC ....... 348/231.99, 231.3, 231.5, 231.7, 231.9, 348/333.02
See application file for complete search history.

(56) References Cited

U.S. PATENT DOCUMENTS

| | | |
|---|---|---|
| 8,804,007 B2* | 8/2014 | Suzuki ................. 348/231.5 |
| 2002/0044690 A1 | 4/2002 | Burgess ................. 382/209 |
| 2008/0094499 A1 | 4/2008 | Ueno et al. ............ 348/372 |
| 2008/0204317 A1 | 8/2008 | Schreve et al. ....... 342/357.13 |
| 2009/0171579 A1* | 7/2009 | Wu et al. ................. 701/211 |
| 2009/0184982 A1 | 7/2009 | Takakura et al. ....... 345/681 |
| 2010/0214443 A1 | 8/2010 | Wang et al. ............ 348/231.3 |
| 2011/0085054 A1 | 4/2011 | Choi et al. ............ 348/231.3 |
| 2011/0085057 A1 | 4/2011 | Takahashi ............. 348/231.3 |
| 2011/0140957 A1 | 6/2011 | Dimpflmaier et al. .. 342/357.25 |
| 2012/0154605 A1 | 6/2012 | Madhav ................ 348/207.1 |
| 2012/0200740 A1 | 8/2012 | Gum et al. ............ 348/231.3 |

FOREIGN PATENT DOCUMENTS

| | | |
|---|---|---|
| JP | 2009-171269 A | 7/2009 |
| WO | WO 02/33955 A2 | 4/2002 |

\* cited by examiner

| IMAGE FILE PATH | LATITUDE | LONGITUDE | MODEL NAME | SERIAL NUMBER | UTC CONVERTED TIME | CORRESPONDING LOG FILE PATH |
|---|---|---|---|---|---|---|
| 701 | 702 | 703 | 704 | 705 | 706 | 707 |
| C:\20100904\IMG_0001.JPG | 3533.9979,N | 13940.8314,E | Model X1 | 123456789 | 2010/9/4 6:26:33 | C:\MyLog\1009040.Log |
| C:\20100904\IMG_0002.JPG | 3533.9952,N | 13940.8264,E | Model X1 | 123456789 | 2010/9/4 6:26:40 | C:\MyLog\1009040.Log |
| C:\20100904\IMG_0003.JPG | 3533.9923,N | 13940.8208,E | Model X1 | 123456789 | 2010/9/4 6:27:56 | C:\MyLog\1009040.Log |
| C:\20100904\IMG_0004.JPG | 3533.9905,N | 13940.8239,E | Model X1 | 123456789 | 2010/9/4 12:52:38 | C:\MyLog\1009040.Log |
| C:\20100905\IMG_0005.JPG | 3529.1863,N | 13925.0861,E | Model X1 | 123456789 | 2010/9/5 3:06:54 | C:\MyLog\1009050.Log |
| C:\20100905\IMG_0006.JPG | 3529.1899,N | 13925.0705,E | Model X1 | 123456789 | 2010/9/5 3:38:12 | C:\MyLog\1009050.Log |
| C:\20100908\IMG_0007.JPG | 3533.9934,N | 13940.8205,E | Model X1 | 123456789 | 2010/9/8 7:17:43 | |

| TIME (UTC) | LATITUDE | LONGITUDE | FILE TYPE |
|---|---|---|---|
| 2010/9/4 6:24:04 | 3534.0002,N | 13940.8300,E | LOG |
| 2010/9/4 6:24:28 | 3533.9994,N | 13940.8321,E | LOG |
| 2010/9/4 6:24:51 | 3533.9979,N | 13940.8314,E | LOG |
| 2010/9/4 6:25:12 | 3533.9946,N | 13940.8252,E | LOG |
| 2010/9/4 6:25:35 | 3533.9987,N | 13940.8291,E | LOG |
| 2010/9/4 6:26:00 | 3533.9951,N | 13940.8278,E | LOG |
| 2010/9/4 6:26:25 | 3533.9970,N | 13940.8299,E | LOG |
| 2010/9/4 6:26:49 | 3533.9940,N | 13940.8251,E | LOG |
| 2010/9/4 6:27:12 | 3533.9935,N | 13940.8260,E | LOG |
| 2010/9/4 6:27:36 | 3533.9932,N | 13940.8235,E | LOG |
| 2010/9/4 6:28:01 | 3533.9916,N | 13940.8202,E | LOG |
| ... | ... | ... | ... |
| 2010/9/4 12:03:40 | 3533.9987,N | 13940.8291,E | LOG |
| 2010/9/4 12:04:03 | 3533.9990,N | 13940.8280,E | LOG |

901　902　903　904

| 1001 | 1002 | 1003 | 1004 | 1005 |
|---|---|---|---|---|
| LOG FILE PATH | POSITIONING START DATE/TIME | POSITIONING END DATE/TIME | MODEL NAME | SERIAL NUMBER |
| C:\MyLog\1009040.Log | 2010/9/4 6:24:04 | 2010/9/4 12:04:03 | Model X1 | 123456789 |
| C:\MyLog\1009050.Log | 2010/9/5 3:28:05 | 2010/9/5 11:50:23 | Model X1 | 123456789 |
| C:\MyLog\1009100.Log | 2010/9/10 3:14:42 | 2010/9/10 12:08:02 | Model X1 | 123456789 |
| C:\MyLog\1009130.Log | 2010/9/13 4:52:31 | 2010/9/13 8:12:13 | Model X1 | 123456789 |
| C:\MyLog\1009131.Log | 2010/9/13 8:52:58 | 2010/9/13 12:38:50 | Model X1 | 123456789 |

1000

1300

| TIME (UTC) | LATITUDE | LONGITUDE | FILE TYPE |
|---|---|---|---|
| 2010/9/4 6:24:04 | 3534.0002,N | 13940.8300,E | LOG |
| 2010/9/4 6:24:28 | 3533.9994,N | 13940.8321,E | LOG |
| 2010/9/4 6:24:51 | 3533.9979,N | 13940.8314,E | LOG |
| 2010/9/4 6:25:12 | 3533.9946,N | 13940.8252,E | LOG |
| 2010/9/4 6:25:35 | 3533.9987,N | 13940.8291,E | LOG |
| 2010/9/4 6:26:00 | 3533.9951,N | 13940.8278,E | LOG |
| 2010/9/4 6:26:25 | 3533.9970,N | 13940.8299,E | LOG |
| 2010/9/4 6:26:33 | 3533.9979,N | 13940.8314,E | IMAGE |
| 2010/9/4 6:26:40 | 3533.9952,N | 13940.8264,E | IMAGE |
| 2010/9/4 6:26:49 | 3533.9940,N | 13940.8251,E | LOG |
| 2010/9/4 6:27:12 | 3533.9935,N | 13940.8260,E | LOG |
| 2010/9/4 6:27:36 | 3533.9932,N | 13940.8235,E | LOG |
| 2010/9/4 6:27:56 | 3533.9923,N | 13940.8208,E | IMAGE |
| 2010/9/4 6:28:01 | 3533.9916,N | 13940.8202,E | LOG |
| ⋮ | ⋮ | ⋮ | ⋮ |
| 2010/9/4 12:03:40 | 3533.9987,N | 13940.8291,E | LOG |
| 2010/9/4 12:04:03 | 3533.9990,N | 13940.8280,E | LOG |
| 2010/9/4 12:52:38 | 3533.9901,N | 13940.8198,E | IMAGE |

INFORMATION PROCESSING APPARATUS AND CONTROL METHOD THEREFOR

CROSS REFERENCE TO RELATED APPLICATION

This application is a continuation of U.S. application Ser. No. 13/358,563 filed on Jan. 26, 2012, the entire disclosure of which is hereby incorporated by reference herein. This application also claims foreign priority under 35 U.S.C. §119 of Japanese Application No. 2011-023245 filed on Feb. 4, 2011.

BACKGROUND OF THE INVENTION

Field of the Invention

The present invention relates to an information processing apparatus and a control method therefor.

Description of the Related Art

In recent years, there has been a GPS log apparatus for receiving a signal from a GPS (Global Positioning System) satellite, and recording, as log data, received position information and date/time information. A digital camera which incorporates a GPS reception function and records a captured image added with position information and date/time information is also available. Log data and image data recorded by these apparatuses have position information such as a latitude and longitude. Displaying, on a map, a position represented by the position information can help recall events associated with a movement route or shooting location.

Today, various utilization methods of log data are well known. For example, it is well known that when a digital camera has no GPS reception function (that is, position information and the like are not added to a captured image), log data recorded by a GPS log apparatus different from the digital camera is used to add position information to a captured image (see Japanese Patent Laid-Open No. 2009-171269). According to Japanese Patent Laid-Open No. 2009-171269, corresponding position information in log data is added to a captured image by matching date/time information contained in the log data with shooting date/time information added to the captured image. Furthermore, Japanese Patent Laid-Open No. 2009-171269 also proposes a technique of improving the matching accuracy by correcting a gap or time difference of the internal clock of a digital camera in a matching operation, a technique of displaying, on a map, the shooting position of an image and a movement route based on log data, and the like.

In Japanese Patent Laid-Open No. 2009-171269, however, since the accuracy of a movement route depends on the recording density of log data (a time interval at which position information and the like are recorded in log data), the accuracy of a movement route drops as the recording density decreases (as the time interval becomes long).

SUMMARY OF THE INVENTION

The present invention has been made in consideration of the above situation, and provides a technique of interpolating position information and the like contained in log data.

According to an aspect of the present invention, there is provided an information processing apparatus comprising: a storage unit configured to store log data, which indicate locations along a path of movement, and image data, wherein the log data contains a plurality of pairs of position information and time information and wherein the image data contains time information and position information indicating a position where an image is captured; and a generation unit configured to generate interpolated log data which contains the plurality of pairs contained in the log data and the pair of position information and time information contained in the image data.

According to another aspect of the present invention, there is provided a control method for an information processing apparatus which includes a storage unit configured to store log data, which indicate locations along a path of movement, and image data, wherein the log data contains a plurality of pairs of position information and time information and wherein the image data contains time information and position information indicating a position where an image is captured, the method comprising: a generation step of generating interpolated log data which contains the plurality of pairs contained in the log data and the pair of position information and time information contained in the image data.

By virtue of the above features, the present invention makes it possible to interpolate position information and the like contained in log data.

Further features of the present invention will become apparent from the following description of exemplary embodiments with reference to the attached drawings.

BRIEF DESCRIPTION OF THE DRAWINGS

FIG. 7 is a table showing an example of an image management list 700;

FIG. 9 is a table showing an example of a movement route display management list 900;

DESCRIPTION OF THE EMBODIMENTS

Embodiments of the present invention will now be described with reference to attached drawings. It should be noted that the technical scope of the present invention is defined by claims, and is not limited by each embodiment described below. In addition, not all combinations of the features described in the embodiments are necessarily required for realizing the present invention.

In the following embodiments, "date/time" and "time" are intended to include "year/month/day/hour/minute/second", unless otherwise specified. To implement the present invention, however, part of "year/month/day/hour/minute/second" may be missing. Even when "year/month/day" is missing (i.e., the term "date/time" or "time" only includes "hour/minute/second"), for example, the present invention can still be implemented except for processes which require "day", such as processes in steps S1260 and S1270 of FIG. 11B.

The following embodiments use a GPS as a system for positioning. However other systems such as a wireless base station may be used as long as it is possible to acquire position information and time information.

[First Embodiment]

An embodiment in which an information processing apparatus of the present invention is applied to a computer will be described below. In this embodiment, a digital camera having a GPS reception function records, as a file, image data with position information, and records, as a GPS log file, log data representing a movement route. Application software (to be simply referred to as an "application" hereinafter) operating on the computer uses the files to display the movement route and a mark indicating a shooting position on a map displayed by itself.

Figure 2:
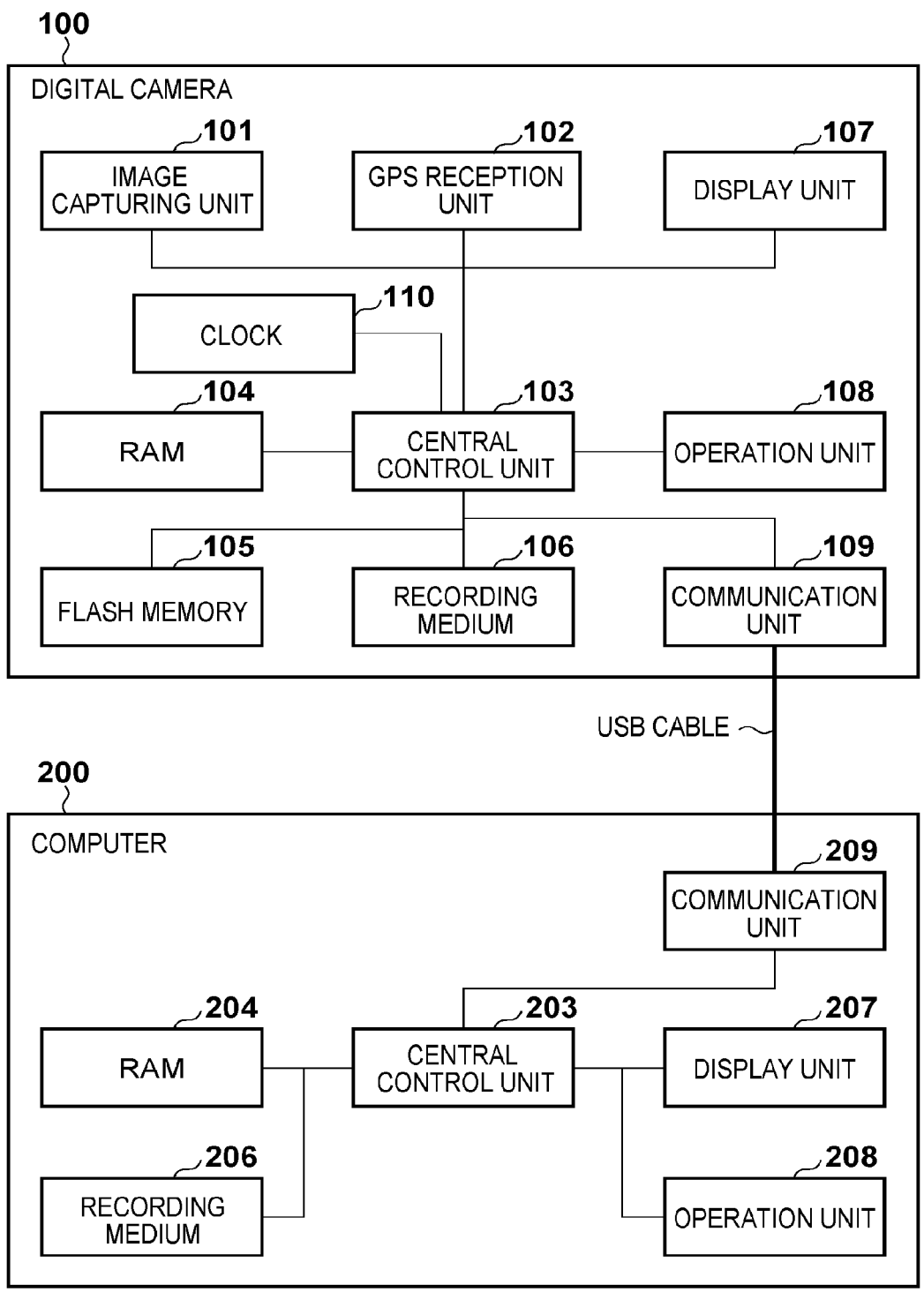
FIG. 2 is a block diagram showing the arrangement of a computer 200 and a digital camera 100 which provides the computer 200 with image data and log data according to the first embodiment.

FIG. 2 shows the arrangement of a digital camera 100 as an example of an image capturing apparatus. Note that it is also possible to use, as an image capturing apparatus, a cellular phone with a camera in place of a digital still camera or a digital video camera. Referring to FIG. 2, the digital camera 100 includes an image capturing unit 101, a GPS reception unit 102, a central control unit 103, a RAM 104, a flash memory 105, a recording medium 106, a display unit 107, an operation unit 108, a communication unit 109, and a clock 110. One hardware component may control the digital camera 100, or a plurality of hardware components may share processing to execute necessary operations as a whole.

The image capturing unit 101 includes a lens, shutter, aperture stop, and image sensor, and images an appropriate amount of light from an object on the image sensor at an appropriate timing. The GPS reception unit 102 (positioning unit) receives a signal from a GPS satellite, and calculates a current position and current time based on the received signal. The calculated current time is represented by UTC (Universal Time, Coordinated) (first standard time). UTC indicates a standard time determined based on International Atomic Time measured by an atomic clock according to the international agreement. The GPS reception unit 102 provides the central control unit 103 with information indicating the current position and current time. The digital camera 100, therefore, can use the GPS reception unit 102 to acquire information (position information) indicating the position of itself, and to acquire information (time information) indicating a time at which the position information is acquired.

According to an input signal or program, the central control unit 103 performs various operations, and controls each component constituting the digital camera 100. More specifically, the central control unit 103 performs image capturing control, display control, recording control, communication control, and the like. The RAM 104 records temporary data, and is used as a work area by the central control unit 103. The flash memory 105 records programs (firmware) for controlling the digital camera 100 and various kinds of setting information.

The recording medium 106 records a shot image file, a GPS log file, and the like. Note that the recording medium 106 in this embodiment is a so-called detachable memory card which can be mounted on a computer or the like to read out an image file or GPS log file. The digital camera 100, however, may incorporate the recording medium 106. That is, the digital camera 100 need only, at least, access the recording medium 106, and read/write an image file and GPS log file from/in the recording medium 106.

The display unit 107 displays a viewfinder image in shooting an image, a shot image, characters for interactive operations, and the like. Note that the digital camera 100 does not necessarily include the display unit 107, and need only have a display control function of controlling display of the display unit 107. The operation unit 108 is used to accept a user operation. For the operation unit 108, for example, buttons, a lever, a touch panel, and the like can be used.

The communication unit 109 connects with an external apparatus to transmit/receive a control command and data. As a protocol for establishing a connection and communicating data, for example, PTP (Picture Transfer Protocol) is used. Note that the communication unit 109 makes communication via a wired connection using a USB (Universal Serial Bus) cable in this embodiment. The present invention, however, is not limited to this, and communication may be made via a wireless connection such as a wireless LAN. The communication unit 109 may directly connect with an external apparatus, or may connect with an external apparatus via a network such as the Internet through a server.

The clock 110 indicates a time conforming to a standard time (second standard time) different from UTC, and supplies the central control unit 103 with information (clock time information) indicating a time. Note that the standard time applied to the clock 110 may accidentally coincide with UTC.

When the digital camera 100 captures an image, the central control unit 103 adds, as a shooting date/time 5081 (to be described later with reference to FIG. 5) in an Exif format, clock time information acquired from the clock 110 in capturing the image to image data. If the GPS reception unit 102 has received a signal from a GPS satellite in capturing the image, the central control unit 103 adds, to the image data, in an Exif format, position information and time information which have been acquired by the GPS reception unit 102 in capturing the image. The position information and time information are added to the image data as a latitude 5101, a longitude 5102, and a positioning date/time 5103 (to be described later with reference to FIG. 5). The central control unit 103 records, as a file, the image data added with the clock time information, position information, and time information in the recording medium 106. Alternatively, if the GPS reception unit 102 has not received a signal necessary for calculation of position information and the like in capturing the image, position information and time information are not recorded for the image file (the clock time information is recorded).

The digital camera 100 has a logger mode, during which it generates log data. More specifically, under control of the central control unit 103, the GPS reception unit 102 receives a signal from a GPS satellite at a predetermined interval recorded in the RAM 104, and supplies position information and time information to the central control unit 103. The central control unit 103 sequentially records, as log data, the position information and time information which are regularly supplied. The log data, therefore, contains a plurality of pairs of position information and time information. The log data is recorded in the recording medium 106, for example, per day, or the log data is divided by a date/time or the like designated by the user and each divided log data is recorded in a file format in the recording medium 106. Note that a timing at which the digital camera transits to a logger mode includes, for example, a timing at which the digital camera is not in a shooting mode (the digital camera is in a playback mode or the like). Furthermore, when the power button of the digital camera 100 is turned off, the digital camera 100 may transit to a logger mode to operate with a minimum power necessary for positioning and creation of log data.

A computer 200 includes a central control unit 203, a RAM 204, a recording medium 206, a display unit 207, an operation unit 208, and a communication unit 209. According to an input signal or program, the central control unit 203 performs various operations, plays back data, and controls each component constituting the computer 200.

The RAM 204 records temporary data, and is used as a work area by the central control unit 203. The recording medium 206 is a hard disk drive (HDD) serving as an auxiliary storage unit, and stores various kinds of data and programs. Note that the recording medium 206 also stores an OS and an application (to be described later). The display unit 207 serves as a display in this embodiment, and displays an image or the screen of an application. Note that the recording medium 206 and the display unit 207 may be incorporated in the computer 200, or may be separate apparatuses.

The operation unit 208 is a keyboard, a mouse, or the like, and is used by the user to input to an application or the like. The communication unit 209 connects with an external apparatus to transmit/receive a control command and data. Although a USB interface is used to connect with the digital camera 100 in this embodiment, the present invention is not limited to this like the communication unit 109.

An application according to this embodiment will be described. The application is executed within the computer 200. Assume that before the following operation, an image file added with clock time information, position information, and time information, and a GPS log file are transmitted from the digital camera 100 to the computer 200, and stored in the recording medium 206.

Figure 3:
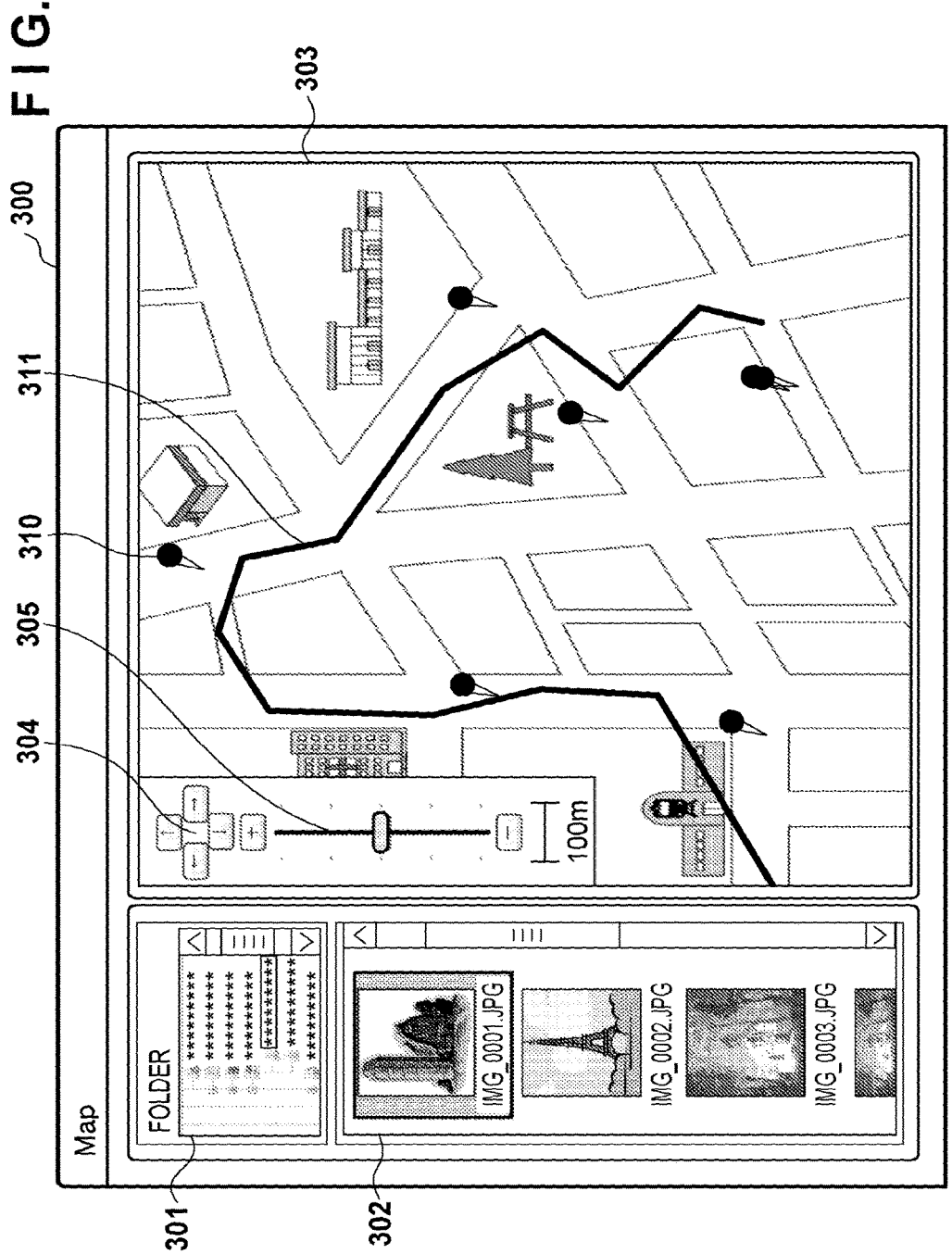
FIG. 3 is a view showing a GUI 300 of an application executed by the computer 200 according to the first embodiment.

FIG. 3 is a view showing a GUI 300 of an application executed by the computer 200 according to the first embodiment. The application of this embodiment can display a map on a screen. Then, the application refers to the image file and GPS log file recorded in the recording medium 206 of the computer 200, and displays, on the map, a movement route and a mark indicating the presence of captured image data based on position information and the like recorded in the files. A detailed description of FIG. 3 will be given below.

In the GUI 300 of FIG. 3, a folder designation region 301 is used to designate image data to be processed in the application. In the folder designation region 301, it is possible to select a folder of a file system formed within the recording medium 206 of the computer 200. In the application, image files stored in the selected folder are to be processed. A thumbnail list display region 302 displays a list of thumbnail images (reduced images) corresponding to the image files contained in the folder selected in the folder designation region 301. A map display region 303 displays a map. When the user operates map moving buttons 304 or a map scale change bar 305, the map display region 303 can display a map of an arbitrary position. Note that the application of this embodiment acquires map data for generating a map by referring to a general Web service but the present invention is not limited to this.

Figure 1:
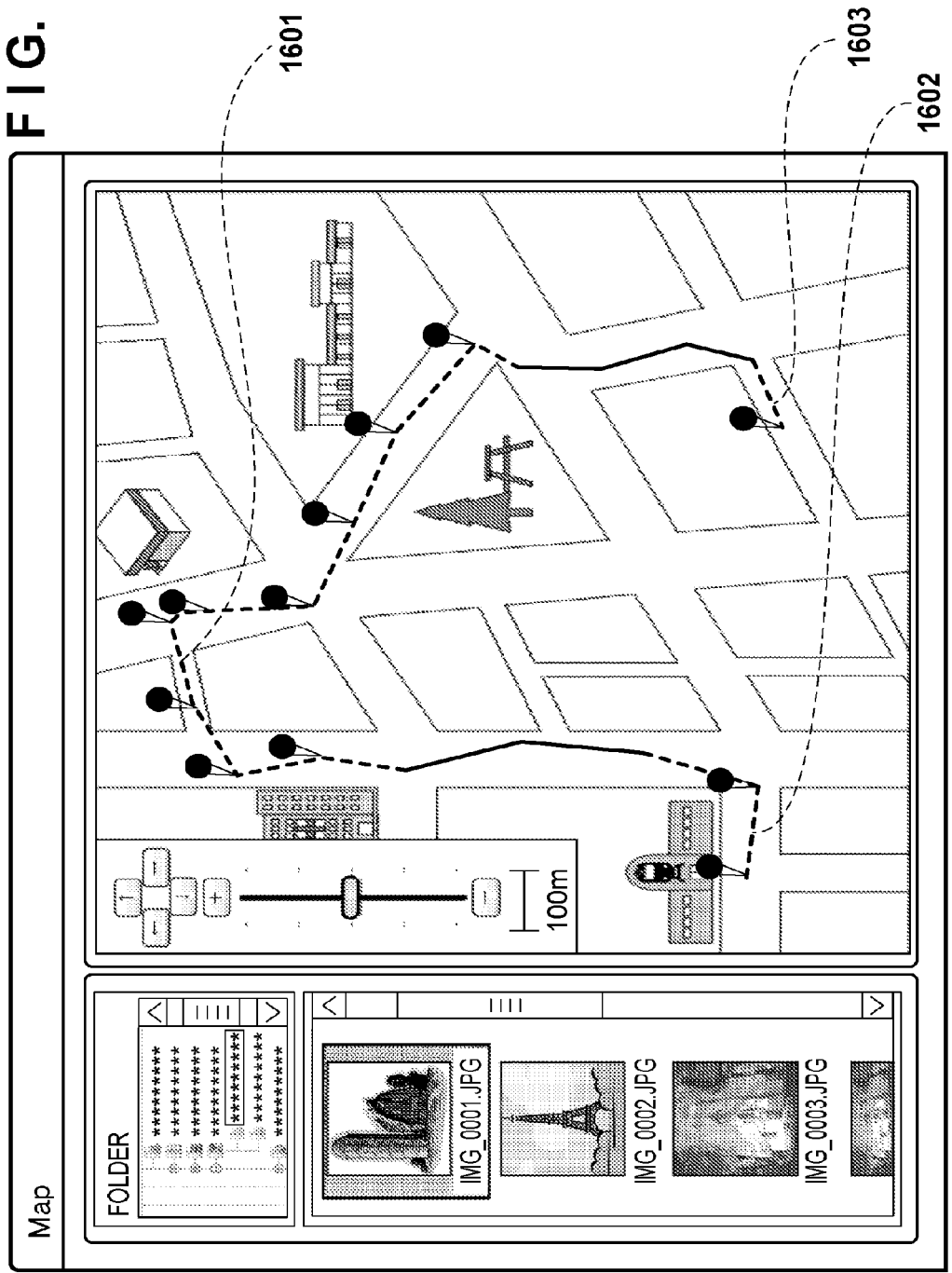
FIG. 1 is a view showing an example of a screen displayed when processing (that is, interpolation processing to be described with reference to FIG. 13) in step S1050 of FIG. 4 is executed.

In this application, a mark 310 indicating the presence of image data is displayed on a map in accordance with position information contained in the image data corresponding to a thumbnail image displayed in the thumbnail list display region 302. Furthermore, based on a GPS log file corresponding to an image being selected in the thumbnail list display region 302 of FIG. 3, a movement route 311 obtained by connecting pieces of position information contained in the GPS log data is displayed on the map (although an interpolated movement route is actually displayed as shown in FIG. 1 (to be described later), a movement route based on only the GPS log file is displayed in FIG. 3 for descriptive convenience).

Processing for displaying the screen of FIG. 3 will be described below with reference to a flowchart shown in FIG. 4. Note that the central control unit 203 of the computer 200 executes the processing to be described below according to a program stored in the recording medium 206.

Figure 4:
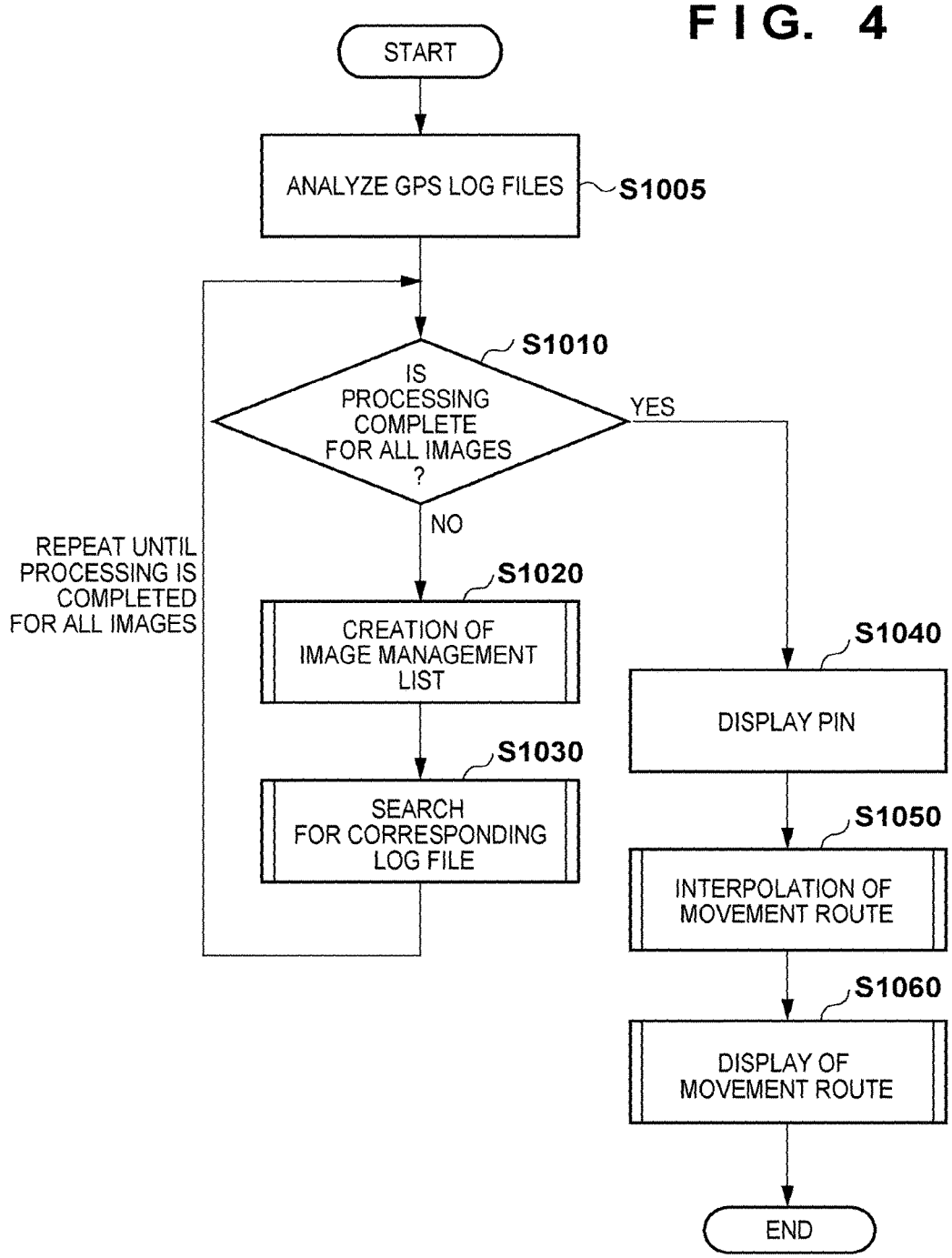
FIG. 4 is a flowchart illustrating processing executed when a folder is selected in a folder designation region 301 of FIG. 3.

FIG. 4 is a flowchart illustrating processing executed when a folder is selected in the folder designation region 301 of FIG. 3. In step S1005, the central control unit 203 analyzes GPS log files. The GPS log files are saved in a predetermined folder within the recording medium 206. As detailed processing in step S1005, the central control unit 203 sequentially refers to the plurality of GPS log files recorded in the predetermined folder, and creates a movement route display management list 900 shown in FIG. 9 (to be described later) and a log management list 1000 shown in FIG. 10 (to be described later).

When the processing in step S1005 is completed, the central control unit 203 processes, one by one, image data contained in the folder designated in the folder designation region 301. More specifically, in step S1010 of FIG. 4, the central control unit 203 determines whether processing in steps S1020 and S1030 is complete for all the image data. If unprocessed image data exists, the central control unit 203 advances the process to step S1020. If the processing is complete for all the image data, the central control unit 203 advances the process to step S1040.

In step S1020, the central control unit 203 creates an image management list 700 (see FIG. 7) which summarizes information about image data to be processed. At this time, the central control unit 203 also performs processing of obtaining the UTC converted time of a shooting date/time (clock time information) which serves as a key when a GPS log file corresponding to image data is searched for. The processing in step S1020 will be described in detail later.

In step S1030, the central control unit 203 specifies a GPS log file corresponding to image data based on time information contained in the image data or the UTC converted clock time information. Furthermore, the central control unit 203 records, in the image management list 700 created in step S1020, information about the specified GPS log file. The processing in step S1030 will be described in detail later.

As described above, the processing in steps S1020 and S1030 is complete for all the image data, the process advances from step S1010 to step S1040. In step S1040, the central control unit 203 displays a mark indicating the presence of an image on the map of the map display region 303 based on the image management list 700. In this embodiment, the central control unit 203 displays the mark 310 at a corresponding position on the map displayed in the map display region 303, as shown in FIG. 3. The mark 310 is displayed for, out of images managed by the image management list 700, every image whose position information is recorded.

In step S1050, the central control unit 203 executes movement route interpolation processing (details thereof will be described later). In step S1060, the central control unit 203 displays the movement route 311 on the map displayed in the map display region 303 (details thereof will be described later).

(S1005: Analysis of GPS Log Files)

Figure 8:
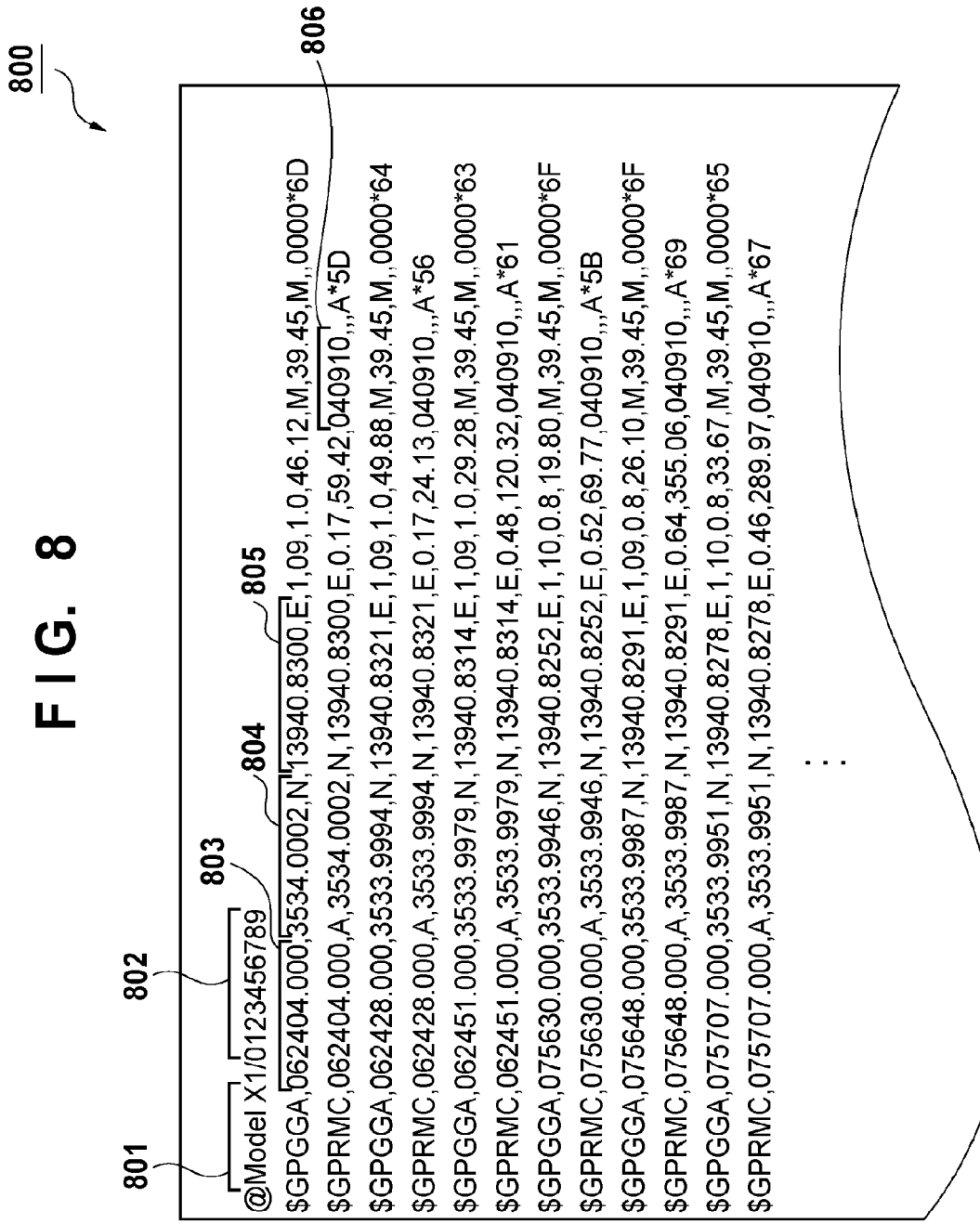
FIG. 8 is a view showing an example of a GPS log file 800.
Figure 10:
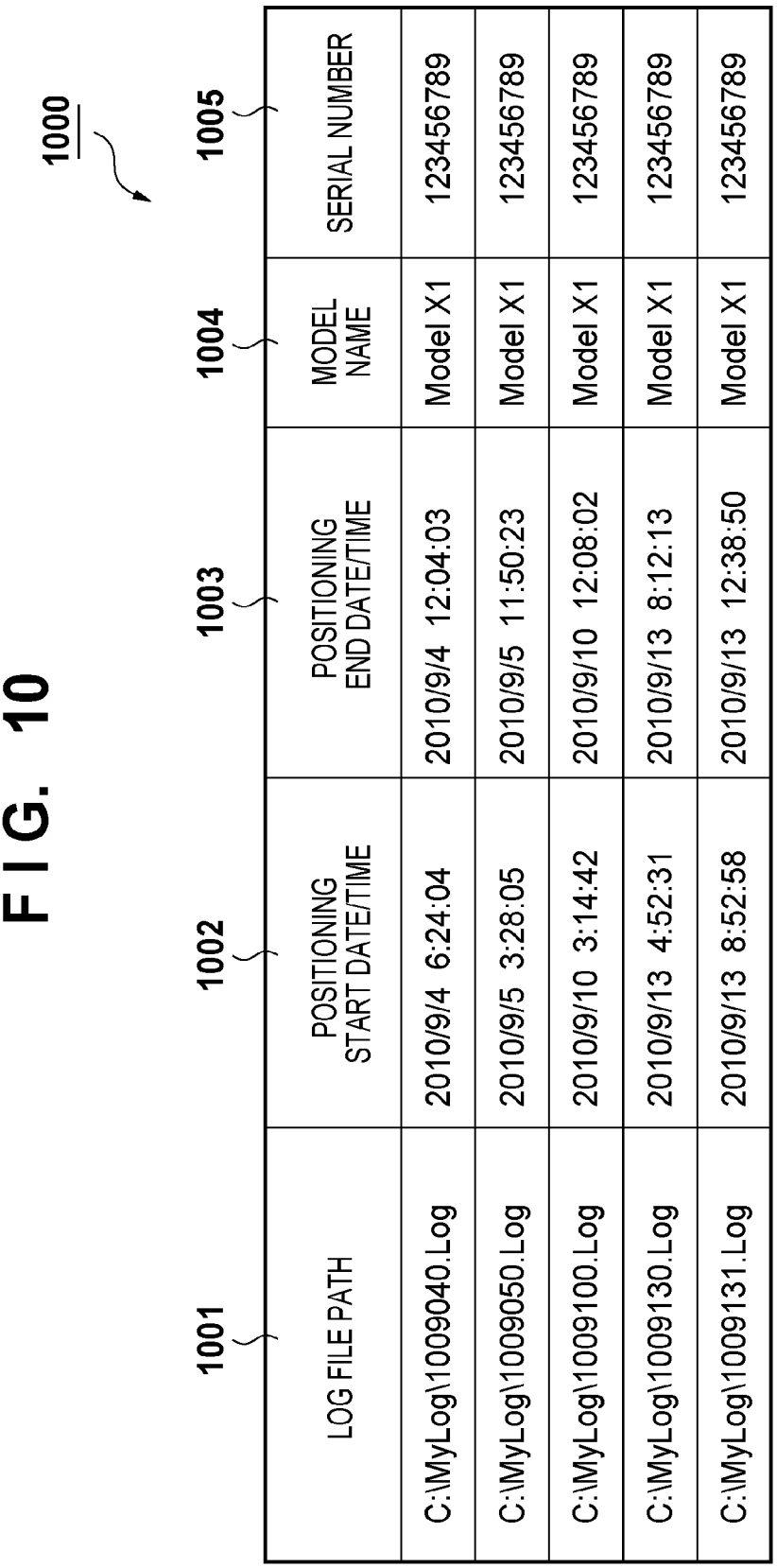
FIG. 10 is a table showing an example of a log management list 1000.

Details of the processing executed in step S1005 of FIG. 4 will be explained with reference to FIGS. 8 to 10. The structure of a GPS log file according to this embodiment will be described first. FIG. 8 is a view showing an example of a GPS log file 800. The GPS log file 800 is saved in the recording medium 106 based on information acquired by the central control unit 103 of the digital camera 100 from the GPS reception unit 102.

At the first line of the GPS log file 800, a model name 801 and a serial number 802 of a GPS log apparatus are recorded. In this embodiment, since the digital camera 100 has a function of the GPS log apparatus (that is, the GPS reception unit 102), the model name and serial number of the digital camera 100 are recorded as the model name 801 and serial number 802, respectively. It is possible to use the model name 801 and the serial number 802 as identification information for identifying the digital camera 100 (an image capturing apparatus) which has generated the GPS log file 800.

At a second line and subsequent lines each starting with a mark "$" of the GPS log file 800, messages complying with an NMEA-0183 format, which are output as log information by the GPS log apparatus by receiving signals, are described. The NMEA-0183 format is a standard, defined by NMEA (National Marine Electronics Association), for making communication using a serial port between a GPS receiver and a navigation device. In this embodiment, two types of messages, that is, GPGGA and GPRMC are recorded. The data fields following each message are separated by commas.

GPGGA indicates for Global Positioning System Fix Data. The data fields include a positioning time 803 conforming to UTC, a latitude 804 (a latitude and a symbol indicating a north latitude (N) or south latitude (S)), a longitude 805 (a longitude and a symbol indicating an east longitude (E) or west longitude (W)), and the quality of the GPS in this order. The data fields also include the number of reception satellites, HDOP (Horizontal Dilution of Precision), an antenna altitude (m) above mean sea level, and the altitude difference (m) of mean sea level from the WGS-84 ellipsoid. Furthermore, the data fields include the age (sec) of DGPS data, the ID of a DGPS reference station, and a checksum.

GPRMC stands for Recommended Minimum Specific GNSS Data. The data fields include a positioning time conforming to UTC, a status indicating validity (A) or invalidity (V), a latitude, a symbol indicating a north latitude (N) or south latitude (S), a longitude, and a symbol indicating an east longitude (E) or west longitude (W) in the order named. The data files also include a ground speed (knot), the direction of movement (degree, true north), a positioning date 806 conforming to UTC, a declination, a mode, and a checksum.

The movement route display management list 900 generated based on the GPS log file 800 will be described next. FIG. 9 is a table showing an example of the movement route display management list 900. The central control unit 203 extracts the positioning time 803, latitude 804, longitude 805, and positioning date 806 from the GPS log file 800, and records them in the movement route display management list 900. Referring to FIG. 9, a combination of the positioning time 803 and the positioning date 806 is recorded as a time 901. The latitude 804 and the longitude 805 are recorded as a latitude 902 and a longitude 903, respectively. Information (origin information) indicating whether the corresponding time 901 and the like originate from log data or image data (to be described later) is recorded as a file type 904. Since the list shown in FIG. 9 is created based on only the GPS log file 800, "log" is recorded as the file type 904 for all entries.

The log management list 1000 will be described next. FIG. 10 is a table showing an example of the log management list 1000. The log management list 1000 enables to handle a plurality of GPS log files (in this case, the recording medium 206 can store a plurality of GPS log files). The file path of each GPS log file is recorded as a log file path 1001. A positioning start date/time (that is, earliest time information) extracted from the GPS log file 800 is recorded as a positioning start date/time 1002. A positioning end date/time (that is, last time information) extracted from the GPS log file 800 is recorded as a positioning end date/time 1003. The model name 801 extracted from the GPS log file 800 is recorded as a model name 1004. The serial number 802 extracted from the GPS log file 800 is recorded as a serial number 1005. Note that the log management list 1000 is sorted in ascending order based on the positioning start date/time 1002. The log management list 1000 may be recorded in the recording medium 206, or may only be temporarily managed in the RAM 204.

(S1020: Creation of Image Management List)

Details of the processing executed in step S1020 of FIG. 4 will be described with reference to FIGS. 5 to 7. The image management list 700 will be explained first. FIG. 7 is a table showing an example of the image management list 700. The image management list 700 manages information obtained by analyzing all image data in a folder (see the folder designation region 301 of FIG. 3) designated by the user. The image management list 700 includes an image file path 701, a latitude 702, a longitude 703, a model name 704, a serial number 705, a UTC converted time 706, and a corresponding log file path 707. Of these data, the image file path 701 to UTC converted time 706 are recorded in step S1020 of FIG. 4, and the corresponding log file path 707 is recorded in step S1030 of FIG. 4 (to be described later with reference to FIGS. 11A and 11B).

Figure 6:
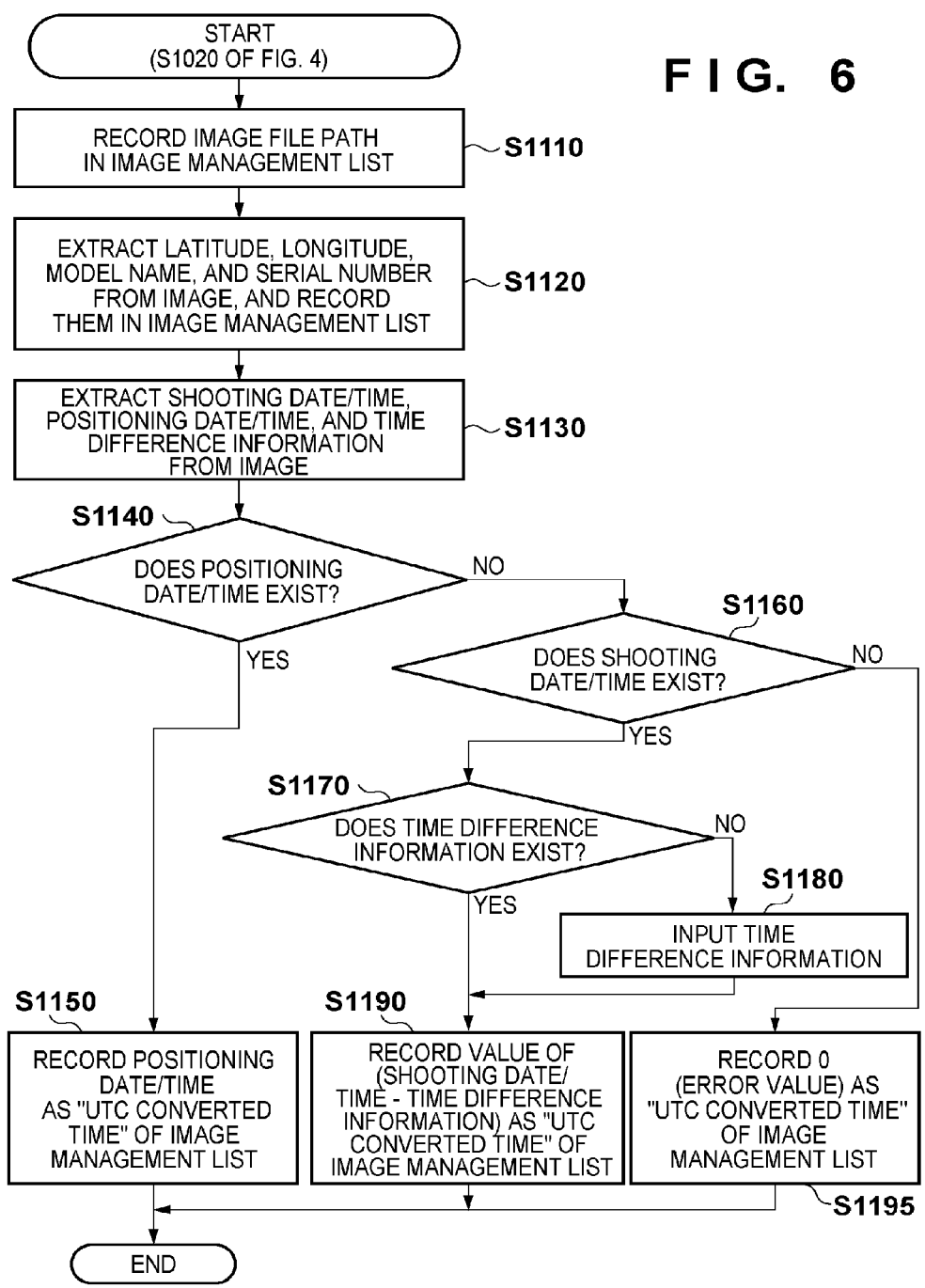
FIG. 6 is a flowchart illustrating details of processing executed in step S1020 of FIG. 4.

FIG. 6 is a flowchart illustrating details of the processing executed in step S1020 of FIG. 4. In step S1110, the central control unit 203 records the file path of image data to be processed as the image file path 701 of the image management list 700. In step S1120, the central control unit 203 analyzes the image data, and extracts a latitude, a longitude, a model name, and a serial number to record them as the latitude 702, longitude 703, model name 704, and serial number 705, respectively.

The structure of the image data will be described with reference to FIG. 5. As described above, the image data is generated by the digital camera 100, transferred to the computer 200, and recorded in a file format in the recording medium 206. In this embodiment, an Exif-JPEG format is used as a file format. Any format such as Exif-TIFF or RAW may be used as long as it is possible to record metadata. Note that Exif (Exchangeable image file format) is the format of digital camera image metadata which has been decided by JEIDA (Japan Electronic Industry Development Association).

Figure 5:
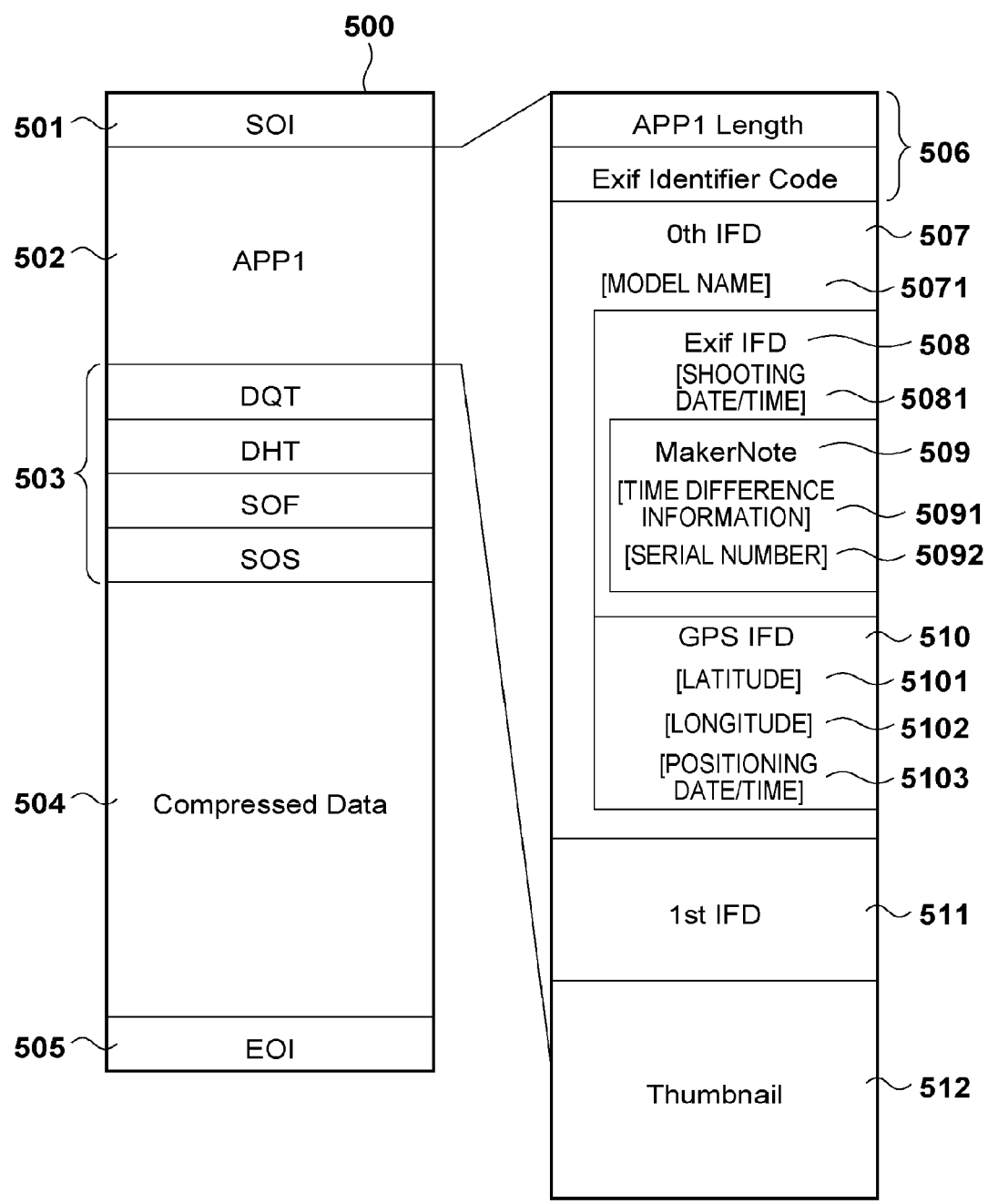
FIG. 5 is a conceptual view showing the data structure of an Exif-JPEG 500.

FIG. 5 is a conceptual view showing an example of the data structure of an Exif-JPEG 500. An SOI 501 serves as a marker indicating the start of the Exif-JPEG 500. An APP1 502 serves as an application marker corresponding to the header portion of the Exif-JPEG 500. A data block 503 includes a quantization table (DQT), a Huffman table (DHT), a frame start marker (SOF), and a scan start marker (SOS). A Compressed Data 504 is compressed data of an image. An EOI 505 serves as a marker indicating the end of the Exif-JPEG 500.

The APP1 502 is configured as shown on the right side of FIG. 5. A data block 506 includes an APP1 Length indicating the size of the APP1 502 and an Exif Identifier Code indicating the identification code of the APP1 502. A 0th IFD 507 is a data block for recording attribute information about the compressed image. The 0th IFD 507 includes, for example, a model name 5071 of the digital camera which has shot the image. In part of the 0th IFD 507, a data block of an Exif IFD 508 and a GPS IFD 510 exists. The Exif IFD 508 includes a tag associated with an Exif version, a tag associated with the characteristics and structure of the image data, a tag associated with the shooting date/time 5081, and a tag associated with shooting conditions such as a shutter speed and lens focal length. Clock time information acquired from the clock 110 of the digital camera 100 is recorded as the shooting date/time 5081. In the Exif IFD 508, a data block of a MakerNote 509 exists. Information unique to a camera manufacturer is recorded in the MakerNote 509. The MakerNote 509 contains, for example, time difference information 5091 used in this embodiment, and a serial number 5092 indicating the unique number of the digital camera 100 used to shoot the image. It is possible to use the model name 5071 and the serial number 5092 as identification information for identifying the digital camera 100 (an image capturing apparatus) which has captured the image. The GPS IFD 510 includes a tag associated with GPS information. Position information such as the latitude 5101 and longitude 5102 used in this embodiment, and the positioning date/time 5103 conforming to UTC are recorded in the GPS IFD 510. A 1st IFD 511 is a data block for recording attribute information associated with a thumbnail image. A Thumbnail 512 contains thumbnail image data.

The time difference information 5091 will now be described. As described above, the digital camera 100 includes the clock 110, and associates image data with a date/time, obtained in capturing the image, as attribute information of the image, and records it as the shooting date/time 5081. The digital camera 100 according to this embodiment can set information indicating the time difference between UTC (the first standard time) and the standard time (the second standard time) applied to the clock 110. In this embodiment, in addition to the shooting date/time 5081, the time difference (the time difference information 5091) set in the digital camera 100 is recorded in the generated image data. If, for example, the user stays in Japan, the clock 110 of the digital camera 100 is set to the Japan local time, and the time difference with respect to UTC is set to 9 hours (540 minutes). In this case, the Japan local time in capturing an image is recorded as a shooting date/time 5081 of image data generated by capturing the image, and a value of 9 hours (540 minutes) is recorded as time difference information 5091.

Referring back to FIG. 6, in step S1120, the central control unit 203 extracts the latitude 5101, longitude 5102, model name 5071, and serial number 5092 from the image data, and records them at corresponding locations of the image management list 700.

In step S1130, the central control unit 203 analyzes the image data to extract the shooting date/time 5081, positioning date/time 5103, and time difference information 5091. These pieces of information are used to calculate the UTC converted time 706 which serves as a key when a GPS log file corresponding to the image data is searched for, and to perform interpolation for the movement route display management list 900. The log management list 1000 (see FIG. 10) records, as information of each GPS log file, the positioning start date/time 1002 and positioning end date/time 1003 according to UTC, and details thereof will be described later. To find a GPS log file corresponding to the image data, a time corresponding to UTC (the UTC converted time 706) when the image is shot is required. Note that the image data does not always include all of the shooting date/time 5081, positioning date/time 5103, and time difference information 5091. For example, the digital camera 100 may be configured to record the latitude 5101 and longitude 5102 and not to record the positioning date/time 5103. In an environment such as the interior of a room in which it is impossible to capture a radio wave from a GPS satellite, the GPS reception unit 102 of the digital camera 100 cannot acquire time information. In this case, the positioning date/time 5103 is not recorded in the image data (in this case, position information (the latitude 5101 and longitude 5102) are not recorded, either). If the digital camera 100 includes no function of setting time difference information, the time difference information 5091 is not recorded. In step S1140 and thereafter, the process branches depending on acquired data.

In step S1140, the central control unit 203 determines whether the positioning date/time 5103 exists in the image data (that is, whether the positioning date/time 5103 has been acquired in step S1130). If the positioning date/time 5103 exists, the central control unit 203 advances the process to step S1150. In this case, in step S1150, the central control unit 203 records, as the UTC converted time 706, the positioning date/time 5103 acquired from the image data (in this case, conversion is not necessary).

If it is determined in step S1140 that there is no positioning date/time 5103, the process advances to step S1160. In this case, in step S1160, the central control unit 203 determines whether the shooting date/time 5081 exists in the image data. If there is no shooting date/time 5081, the central control unit 203 advances the process to step S1195 to record "0" indicating an error as the UTC converted time 706 of the image management list 700.

If it is determined in step S1160 that the shooting date/time 5081 exists, the process advances to step S1170. In this case, in step S1170, the central control unit 203 determines whether the time difference information 5091 exists in the image data. If the time difference information 5091 exists, the central control unit 203 advances the process to step S1190 to record, as the UTC converted time 706 of the image management list 700, a value obtained by subtracting the time difference information 5091 from the shooting date/time 5081. Alternatively, if there is no time difference information 5091, the central control unit 203 prompts the user to input time difference information in step S1180, and calculates the UTC converted time 706 based on the input value to record it in step S1190.

As described above, with the processing in steps S1130 to S1190, it is possible to acquire the UTC converted time 706 if the image data contains at least the shooting date/time 5081 or the positioning date/time 5103.

(S1030: Search for Corresponding Log File)

The processing executed in step S1030 of FIG. 4 will be described in detail with reference to FIGS. 11A and 11B. In step S1030, the central control unit 203 refers to the log management list 1000 and the UTC converted time 706 acquired in step S1020, specifies a GPS log file corresponding to the image data, and sets the corresponding log file path 707 of the image management list 700.

Figure 11A:
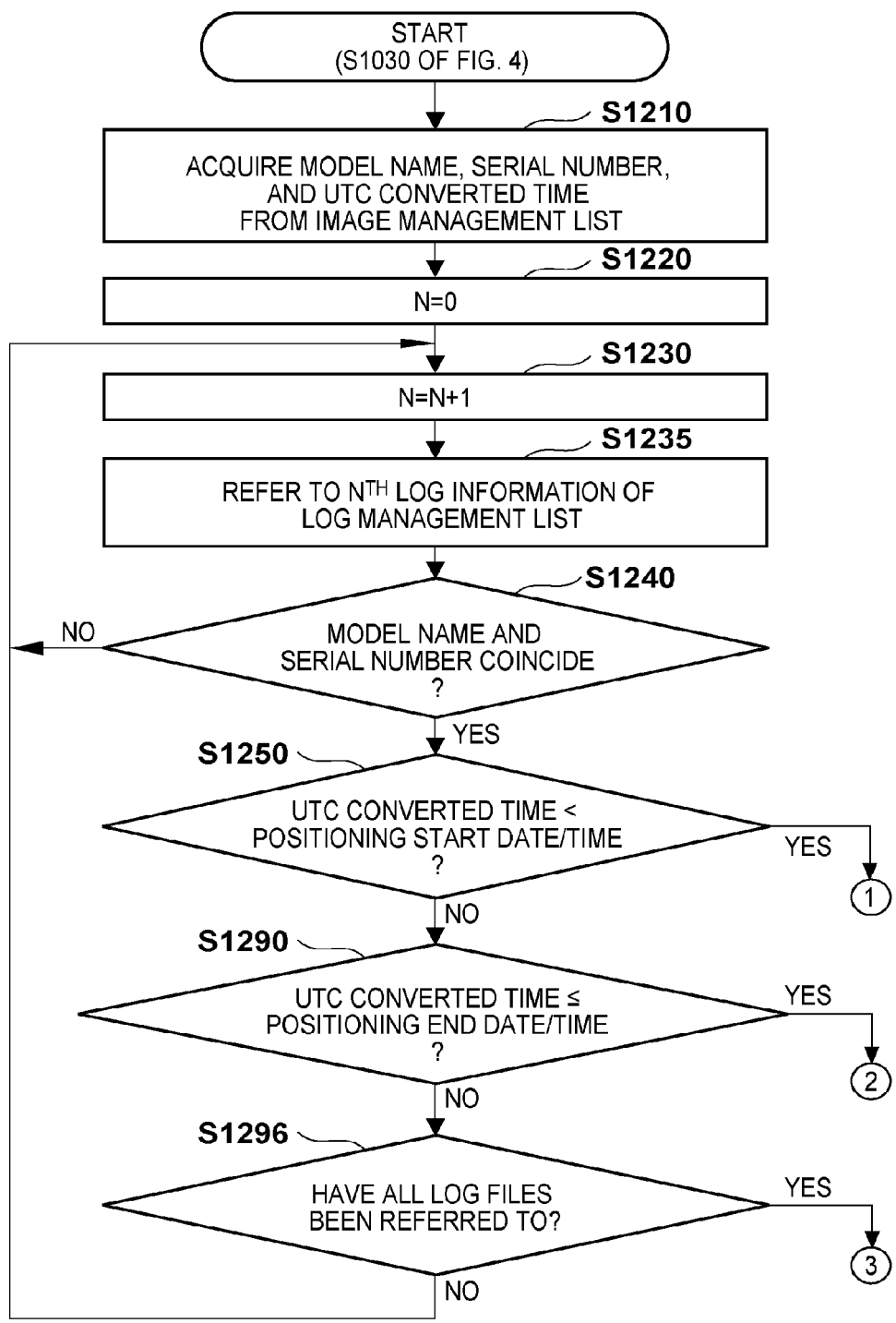
FIGS. 11A and 11B are flowcharts illustrating details of processing executed in step S1030 of FIG. 4.
Figure 11B:
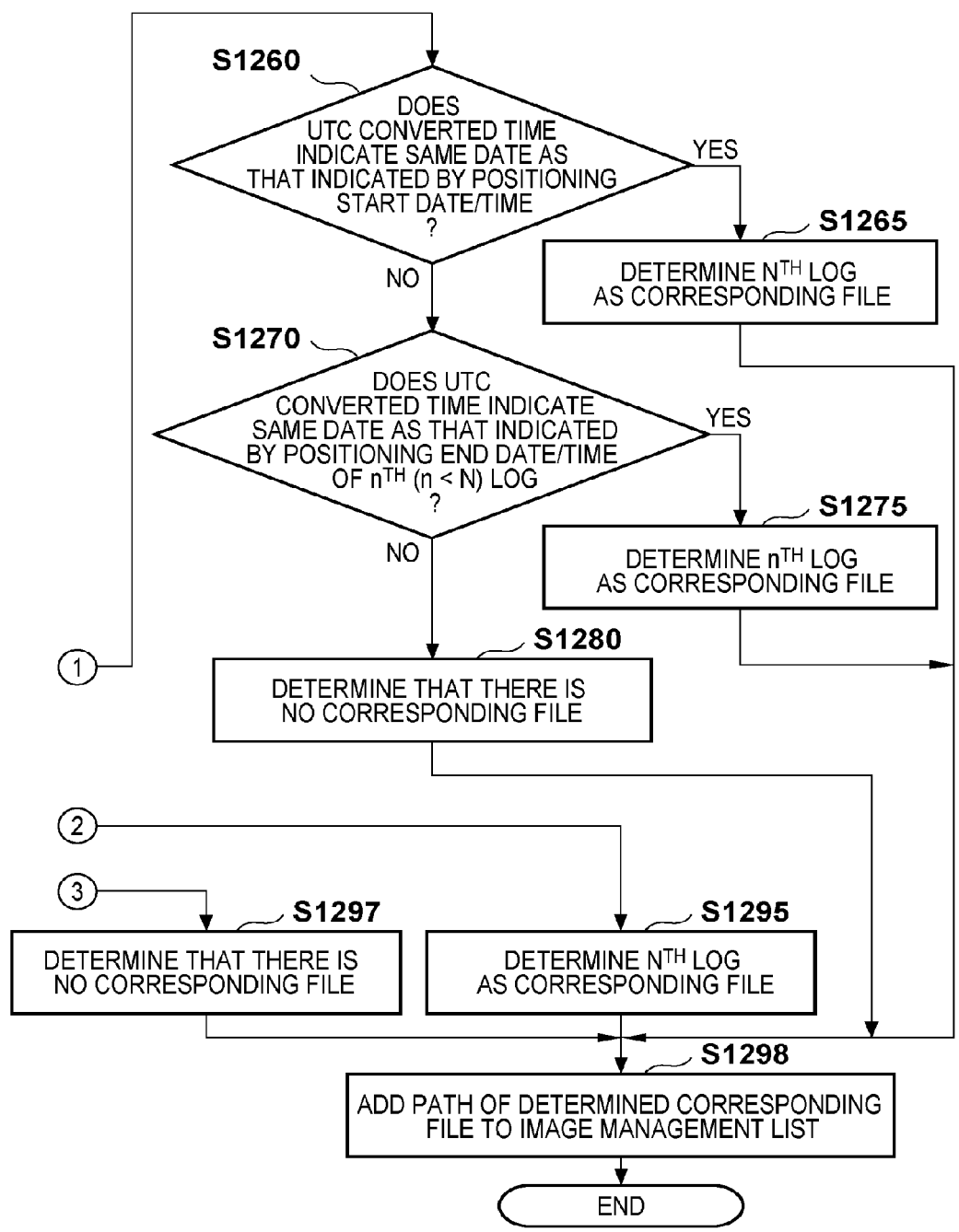

FIGS. 11A and 11B are flowcharts illustrating details of the processing executed in step S1030 of FIG. 4. In step S1210, the central control unit 203 acquires, from the image management list 700, the model name 704, serial number 705, and UTC converted time 706 of the image data to be processed. In step S1220, the central control unit 203 initializes a variable N to 0. The variable N indicates the order of GPS log files included in the log management list 1000 of FIG. 10. In step S1230, the central control unit 203 increments the value of the variable N by 1. In step S1235, the central control unit 203 refers to Nth log information of the log management list 1000. In step S1240, the central control unit 203 determines whether the model name 704 and serial number 705 acquired in step S1210 coincide with the model name 1004 and serial number 1005 of the Nth log information, respectively. If the model names or serial numbers do not coincide with each other, the central control unit 203 returns the process to step S1230 (in this case, it is determined that the Nth GPS log file does not correspond to the image data to be processed); otherwise, the central control unit 203 advances the process to step S1250.

In step S1250, the central control unit 203 determines whether the UTC converted time 706 acquired in step S1210 is earlier than a positioning start date/time 1002 of the Nth GPS log file. If the time 706 is earlier than the date/time 1002, the central control unit 203 advances the process to step S1260 to determine whether the UTC converted time indicates the same date as that indicated by the positioning start date/time 1002 of the Nth GPS log file. If it is determined that the same date is indicated, the central control unit 203 determines the Nth GPS log file as a corresponding log file in step S1265, and advances the process to step S1298; otherwise, the central control unit 203 advances the process to step S1270.

In step S1270, the central control unit 203 determines whether the UTC converted time 706 indicates the same date as that indicated by a positioning end date/time 1003 of an nth (n<N) GPS log file. The nth GPS log file is a last GPS log file in which the model name coincides with the model name 704 and the serial number coincides with the serial number 705 in step S1240. If the UTC converted time 706 indicates the same date as that indicated by the positioning end date/time 1003 of the nth GPS log file, the central control unit 203 advances the process to step S1275, determines the nth GPS log file as a corresponding log file, and then advances the process to step S1298. If the UTC converted time 706 does not indicate the same date as that indicated by the positioning end date/time 1003 of the nth GPS log file, the central control unit 203 advances the process to step S1280 to determine that there is no corresponding GPS log file. In this case, there is no positioning start date/time 1002 or positioning end date/time 1003 which indicates the same date as that indicated by the UTC converted time 706.

By the determination operations in steps S1260 and S1270, it becomes possible to handle cases where there is no GPS log file such that the UTC converted time 706 is between the earliest time (the positioning start date/time 1002) and the last time (the positioning end date/time 1003). In this case, in steps S1265 and S1275, a GPS log file which contains time information indicating the same date as that indicated by the UTC converted time 706 is selected. Moreover, as a result of these determination operations, it may be recorded that there is no GPS log file corresponding to C:¥20100908¥IMG_0007.JPG, as shown in FIG. 7. Even if, however, there is no GPS log file in which the same date is indicated, a GPS log file in which the positioning start date/time 1002 or positioning end date/time 1003 is nearest to the UTC converted time 706 may be determined as a corresponding log file. In this case, even a GPS log file in which the positioning start date/time 1002 or positioning end date/time 1003 is nearest to the UTC converted time 706 may not be determined as a corresponding log file when the difference between the date/time 1002 or 1003 and the UTC converted time 706 exceeds a threshold.

If it is determined in step S1250 that the UTC converted time 706 is not earlier than the positioning start date/time 1002 of the Nth GPS log file, the process advances to step S1290. In this case, the central control unit 203 determines in step S1290 whether the UTC converted time 706 is equal to or earlier than a positioning end date/time 1003 of the Nth GPS log file. If the time 706 is earlier than the date/time 1003, the central control unit 203 determines the Nth GPS log file as a corresponding log file in step S1295, and advances the process to step S1298. In this case, the UTC converted time 706 is between the positioning start date/time 1002 and the positioning end date/time 1003 of the Nth GPS log file.

Alternatively, if it is not determined in step S1290 that the UTC converted time 706 is not equal to or earlier than the positioning end date/time 1003 of the Nth GPS log file, the central control unit 203 determines in step S1296 whether all the GPS log files have been referred to. If not all the GPS log file have been referred to, the process returns to step S1230; otherwise, the central control unit 203 determines in step S1297 that there is no corresponding GPS log file, and advances the process to step S1298. In step S1298, the central control unit 203 records the path of the determined corresponding GPS log file as the corresponding log file path 707 of the image management list 700 of FIG. 7.

Note that in this embodiment, the image capturing time (shooting date/time 5081) is converted into UTC in creating the image management list 700, as described in step S1190 of FIG. 6. Instead of converting the image capturing time into UTC, however, the time difference between the clock 110 and UTC may be added to the time information (time 901) of the GPS log file. That is, in any way, at least one of the shooting date/time 5081 and the time 901 need only be corrected so that they comply with the same standard time. Note that when correcting the time 901, it is necessary to correct the positioning date/time 5103 in the same manner in step S1150 of FIG. 6.

Although it is confirmed in step S1240 that the model names coincide with each other and the serial numbers coincide with each other in this embodiment, this processing may be omitted. If, for example, a GPS log apparatus different from the digital camera 100 generates a GPS log file, a model name and the like contained in image data do not coincide with those contained in the GPS log file. In such case, omitting the processing in step S1240 enables to search for a corresponding log file.

According to the flowcharts of FIGS. 11A and 11B, there is one corresponding log file for each image data. The process, however, may be changed so that each image data can have two or more corresponding log files. If the process is changed to return to step S1230 from step S1265, S1275, or S1295 instead of advancing to step S1298, each image data can have two or more corresponding log files.

(S1050: Interpolation of Movement Route)

Figure 12:
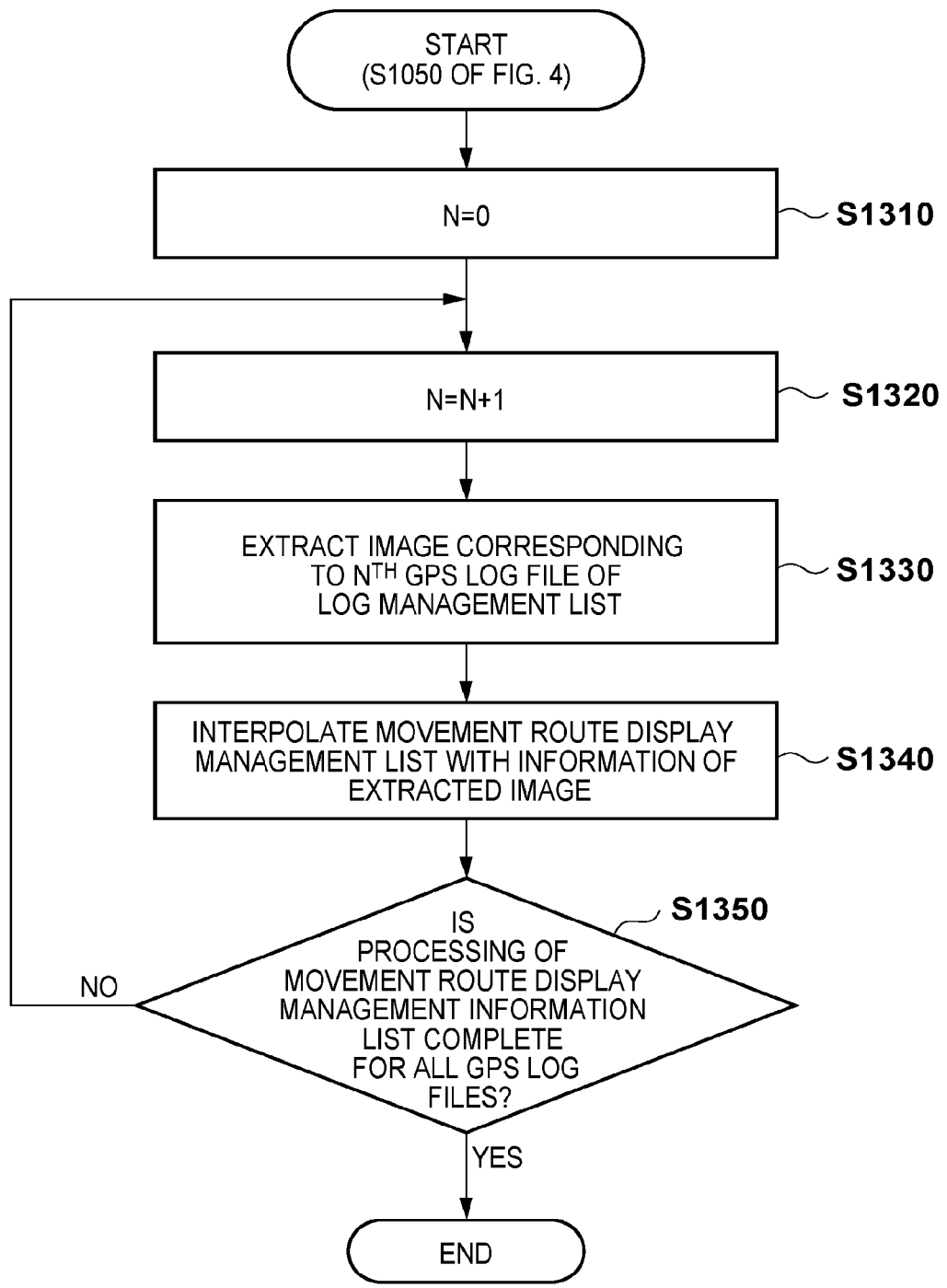
FIG. 12 is a flowchart illustrating details of processing executed in step S1050 of FIG. 4.
Figure 13:
FIG. 13 is a table showing an interpolated movement route display management list 1300 (interpolated log data) generated as a result of processing in step S1340 of FIG. 13.

The processing executed in step S1050 of FIG. 4 will be described in detail with reference to FIGS. 12 and 13. FIG. 12 is a flowchart illustrating details of processing executed in step S1050 of FIG. 4. In step S1310, the central control unit 203 initializes the variable N to 0. The variable N indicates the order of the GPS log files included in the log management list 1000 of FIG. 10. In step S1320, the central control unit 203 increments the value of the variable N by 1. In step S1330, the central control unit 203 refers to the corresponding log file path 707 of the image management list 700 of FIG. 7, and extracts image data which has the Nth GPS log file of the log management list 1000 as its corresponding log file.

In step S1340, the central control unit 203 performs interpolation for the movement route display management list 900 of FIG. 9 corresponding to the Nth GPS log file. More specifically, the central control unit 203 inserts, as the time 901, latitude 902, and longitude 903, the UTC converted time 706, latitude 702, and longitude 703 of the image data extracted in step S1330 to the movement route display management list 900, respectively, in chronological order. At this time, "image" indicating that the inserted entry originates from image data is set as the file type 904. With this processing, it is possible to interpolate position information contained in the image data into the log data. FIG. 13 is a table showing an interpolated movement route display management list 1300 (interpolated log data) which is generated as a result of the processing in step S1340.

In step S1350, the central control unit 203 determines whether the interpolation processing of the movement route display management list 900 is complete for all the GPS log files (that is, the interpolation processing is complete up to the last GPS log file of the log management list 1000). If the interpolation processing is complete, the central control unit 203 ends the process of the flowchart; otherwise, the central control unit 203 returns the process to step S1320.

(S1060: Display of Movement Route)

Figure 14:
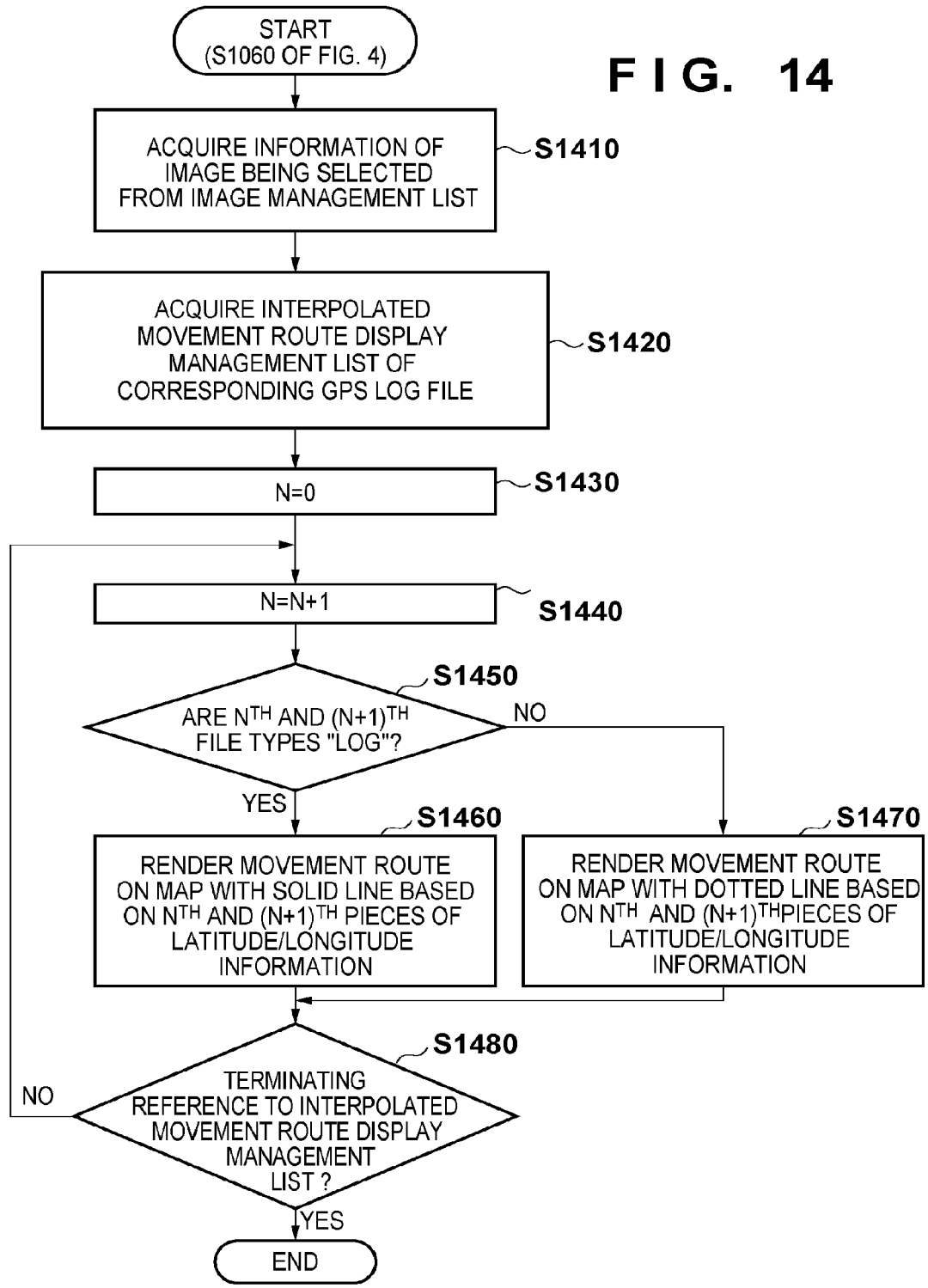
FIG. 14 is a flowchart illustrating details of processing executed in step S1060 of FIG. 4.

The processing executed in step S1060 of FIG. 4 will be described in detail with reference to FIGS. 14, 15, and 1. FIG. 14 is a flowchart illustrating details of the processing executed in step S1060 of FIG. 4. In step S1410, the central control unit 203 acquires, from the image management list 700 of FIG. 7, information of the image being selected in the thumbnail list display region 302 of FIG. 3. In step S1420, the central control unit 203 refers to the image management list 700 to acquire the interpolated movement route display management list 1300 which corresponds to a GPS log file corresponding to the image being selected. In step S1430, the central control unit 203 initializes the variable N to 0. The variable N indicates the order of entries included in the interpolated movement route display management list 1300 of FIG. 13. In step S1440, the central control unit 203 increments the value of the variable N by 1. In step S1450, the central control unit 203 determines whether the file types of the Nth and (N+1)th entries of the interpolated movement route display management list 1300 are "log". If both the file types are "log", the central control unit 203 renders a movement route by connecting, with a solid line, positions on the map which correspond to the Nth and (N+1)th pieces of latitude/longitude information in step S1460. Alternatively, if both the file types are not "log" (at least one of the file types is "image"), the central control unit 203 renders a movement route by connecting, with a dotted line, positions on the map which correspond to the Nth and (N+1)th pieces of latitude/longitude information in step S1470. The central control unit 203 determines in step S1480 whether the processing is complete up to the end of the interpolated movement route display management list 1300. If the processing is complete, the central control unit 203 ends the process of the flowchart; otherwise, the central control unit 203 returns the process to step S1440.

Figure 15:
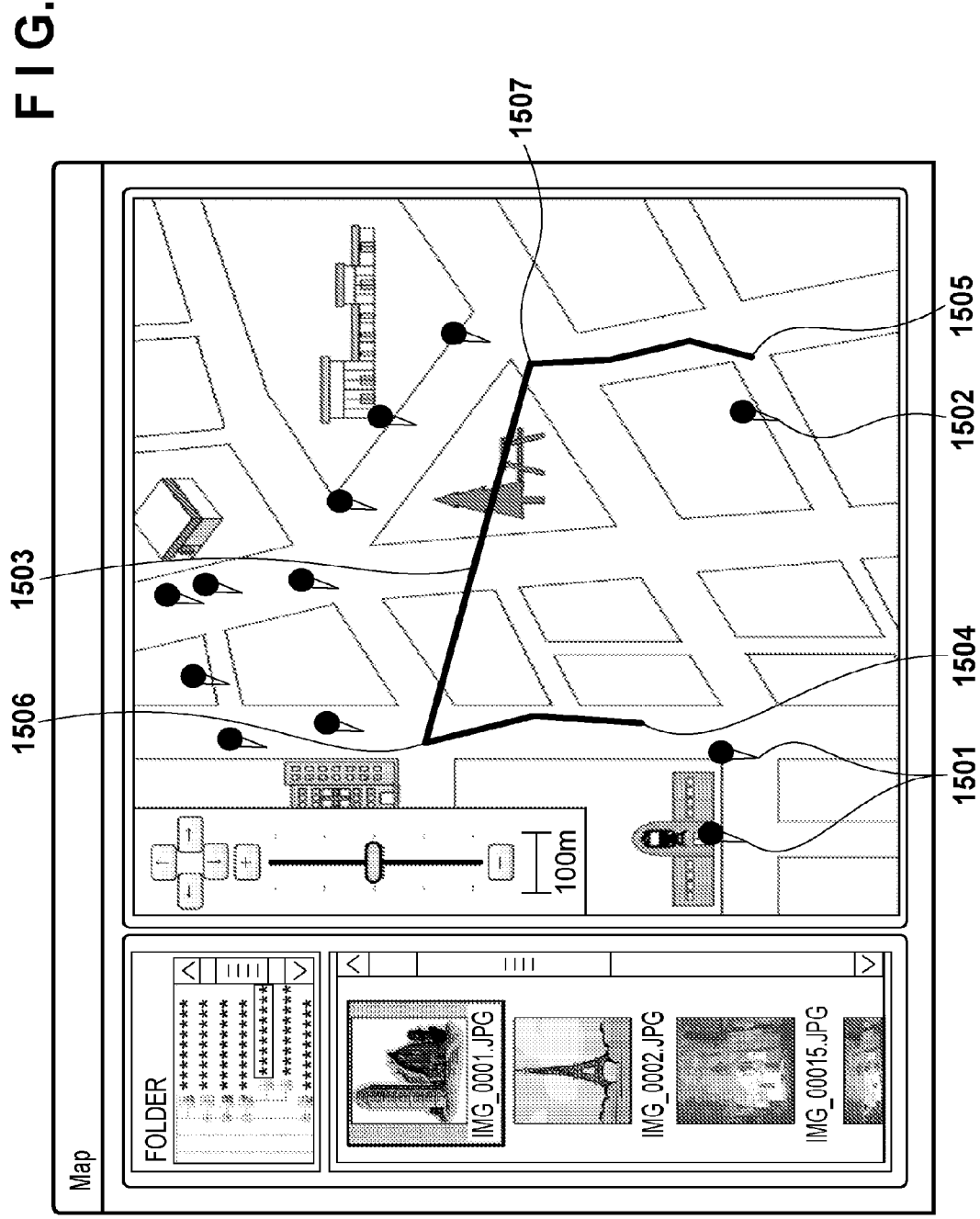
FIG. 15 is a view showing an example of a screen displayed when the processing (that is, the interpolation processing to be described with reference to FIG. 13) in step S1050 of FIG. 4 is not executed.

FIG. 15 is a view showing an example of a screen displayed when the processing (that is, the interpolation processing described with reference to FIG. 13) in step S1050 of FIG. 4 is not executed. Referring to FIG. 15, marks 1501 serve as markers indicating the positions of images shot before the positioning start date/time of a corresponding GPS log file. A mark 1502 serves as a marker indicating the position of an image shot after the positioning end date/time of the corresponding GPS log file. Other marks serve as markers indicating the positions of images shot between the positioning start date/time and the positioning end date/time of the corresponding GPS log file. A thick line is displayed as a movement route 1503. A location with a latitude and longitude recorded at the positioning start date/time of the GPS log file is at a start point 1504 of the movement route and a location with a latitude and longitude recorded at the positioning end date/time of the GPS log file is at an end point 1505 of the movement route. While moving from a point 1506 to a point 1507, the digital camera 100 is in a shooting mode, and therefore, recording in the GPS log file is not performed. The movement route is rendered by connecting, with line segments, pieces of latitude/longitude information recorded in the GPS log file. If, therefore, a period of time during which recording in the GPS log file is not performed is long, locations which the user did not actually pass through are rendered as a movement route. Thus, a movement route obtained by connecting the point 1506 with the point 1507 using a straight line is displayed.

On the other hand, FIG. 1 shows an example of a screen displayed when the processing (that is, the interpolation processing described with reference to FIG. 13) in step S1050 of FIG. 4 is executed. A movement route, shown in FIG. 1, which has been interpolated with images, having position information, of marks is rendered with dotted lines (for example, dotted lines 1601, 1602, and 1603), and a movement route based on latitude/longitude information recorded in a GPS log file corresponding to a displayed image is rendered with solid lines. The dotted line 1601 indicates a movement route interpolated with the images which have position information and have been shot between the positioning start date/time and the positioning end date/time of the GPS log file. The dotted line 1602 indicates a movement route added by the images which have position information and have been shot before the positioning start date/time of the GPS log file. The dotted line 1603 indicates a movement route added by the images which have position information and have been shot after the positioning end date/time of the GPS log file.

Note that although, in this embodiment, for descriptive convenience or for enabling to discriminate an interpolated movement route from the information recorded in the GPS log file, a movement route interpolated with images is rendered with a dotted line, an interpolated movement route may be rendered with a solid line. An interpolated movement route may be discriminated from the information recorded in the GPS log file by a broken line or the color of a line segment.

As described above, according to this embodiment, the computer 200 generates interpolated log data (the interpolated movement route display management list 1300) containing a plurality of pairs of position information and time information contained in log data and a plurality of pairs of position information and time information contained in image data. This enables to interpolate the position information contained in the image data for the position information and the like contained in the log data.

This interpolation method is effective especially when a logging mode and a shooting mode are mutually exclusive. This is because, if the logging mode and the shooting mode are mutually exclusive, the digital camera cannot perform positioning in the logging mode during the shooting mode, and therefore, GPS log data does not contain position information during the shooting mode. In this embodiment, the missing locations of the GPS log data are interpolated using image data which have position information and have been obtained in the shooting mode.

[Other Embodiments]

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-023245 filed on Feb. 4, 2011, which is hereby incorporated by reference herein in its entirety.

What is claimed is:

1. An information processing apparatus comprising:
   a non-transitory memory configured to store log data and image data, wherein
   the log data indicates locations along a path of movement,
   the log data contains a plurality of pieces of position information and a plurality of pieces of time information, each of which corresponds to a respective one of the plurality of pieces of position information,
   the image data contains a metadata region including time information indicating a time when an image is captured and position information indicating a position where the image is captured, and
   the position information contained in the metadata region of the image data is obtained at a timing at which the image is captured, the timing being different from timings at which the plurality of position information contained in the log data are obtained; and
   a processor coupled to the non-transitory memory, wherein the processor is programmed to function as a display control unit configured to display, on a display device, the plurality of position information contained in the log data and the position information contained in the metadata region of image data in an order corresponding to the plurality of time information contained in the log data and the time information contained in the metadata region of the image data,
   wherein, if the non-transitory memory stores first image data that contains a metadata region including first time information indicating a first time when a first image is captured, the first time being next to a second time indicated by second time information contained in the log data in the order, the display control unit controls the display unit to display a first position indicated by position information contained in the metadata region of the first image data and a second position indicated by position information corresponding to the second time information of the log data such that the first and second positions are connected to each other, and
   wherein, if the non-transitory memory does not store the first image data, the display control unit controls the display unit to display the second position and a third position indicated by position information corresponding to third time information of the log data indicating a third time which is next to the second time in the order such that the second and third positions are connected to each other.

2. The information processing apparatus according to claim 1, wherein the display control unit displays, on a map, a connection of positions for discriminating between a connection of two positions from the log data and a connection of two positions including a position from the image data.

3. The information processing apparatus according to claim 1, wherein
   the non-transitory memory is configured to store a plurality of log data, and
   the display control unit displays the first and second positions using log data from the plurality of pieces of log data, such that a time indicated by the time information contained in the metadata region of the first image data is between an earliest time and a latest time that are indicated by the plurality of pieces of time information contained in the log data to be used.

4. The information processing apparatus according to claim 1, wherein the image data is data captured by an image capturing apparatus, and
   the log data is data acquired by the image capturing apparatus as a position of the image capturing apparatus.

5. The information processing apparatus according to claim 4, wherein
   the log data contains identification information for identifying the image capturing apparatus that acquired the plurality of pieces of position information and the plurality of pieces of time information of the log data,
   the image data contains identification information for identifying the image capturing apparatus that captured an image represented by the image data, and
   the display control unit displays the first and second positions using the log data and the image data when the identification information contained in the log data coincides with the identification information contained in the first image data.

6. The information processing apparatus according to claim 1,
   wherein, if the non-transitory memory stores first image data that contains a metadata region including first time information indicating the first time when the first image is captured, the first time being next to the second time indicated by second time information contained in the log data in the order and the first image satisfies a predetermined condition, the display control unit controls the display unit to display the first position indicated by position information contained in the metadata region of the first image data and the second position indicated by position information corresponding to the second time information of the log data such that the first and second positions are connected to each other, and wherein, if the non-transitory memory does not store the first image data or the first image data does not satisfy the predetermined condition, the display control unit controls the display unit to display the second position and the third position indicated by position information corresponding to third time information of the log data indicating a third time which is next to the second time in the order such that the second and third positions are connected to each other.

7. The information processing apparatus according to claim 6, wherein the predetermined condition includes that the first image data is selected.

8. An information processing apparatus comprising:
a communication unit;
a non-transitory memory; and
a processor coupled to the memory, which executes the following:
receiving, via the communication unit, log data containing a plurality of position data and a plurality of corresponding time data;
receiving image data with which position data indicating an image capturing position and time data indicating an image capturing time are associated;
creating a locus by serially connecting the plurality of position data contained in the log data based on the time data contained in the log data;
correcting the locus by serially connecting the position data associated with the image data and the plurality of position data contained in the log data based on the time data associated with the image data and the time data contained in the log data so that the corrected locus shows a more precise route than the locus created based only on the log data; and
displaying the corrected locus on a display unit.

9. The information processing apparatus according to claim 8, wherein the processor corrects the locus by inserting the position data associated with the image data between the plurality of position data contained in the log data, based on the time data contained in the log data and the time data associated with the image data.

10. The information processing apparatus according to claim 9, wherein the processor performs control to display the locus on a map, wherein the processor displays the locus on the map in a manner where route portions connecting any two position data contained in the log data are distinguished from other route portions.

11. The information processing apparatus according to claim 8, wherein
the log data contains identification information for identifying an apparatus that has generated the log data,
the image data contains identification information for identifying an apparatus that has generated the image data, and
the processor corrects the locus using the position data associated with the image data in a case where the identification information contained in the log data coincides with the identification information contained in the image data.

12. The information processing apparatus according to claim 8, wherein the processor determines the image data for use in the correcting regardless of whether or not the position data associated with the image data coincides with one of the plurality of position data contained in the log data.

13. A control method for an information processing apparatus that includes a non-transitory memory configured to store log data and image data, wherein the log data indicates locations along a path of movement, wherein the log data contains a plurality of pieces of position information and a plurality of pieces of time information, each of which corresponds to a respective one of the plurality of pieces of position information, wherein the image data contains a metadata region including time information indicating a time when an image is captured and position information indicating a position where the image is captured, and wherein the position information contained in the metadata region of the image data is obtained at a timing at which the image is captured, the timing being different from timings at which the plurality of position information contained in the log data are obtained, the control method comprising:
displaying, on a display device, the plurality of position information contained in the log data and the position information contained in the metadata region of image data in an order corresponding to the plurality of time information contained in the log data and the time information contained in the metadata region of the image data;
if the non-transitory memory stores first image data that contains a metadata region including first time information indicating a first time when a first image is captured, the first time being next to a second time indicated by second time information contained in the log data in the order, displaying a first position indicated by position information contained in the metadata region of the first image data and a second position indicated by position information corresponding to the second time information of the log data such that the first and second positions are connected to each other; and
if the non-transitory memory does not store the first image data, displaying the second position and a third position indicated by position information corresponding to third time information of the log data indicating a third time which is next to the second time in the order such that the second and third positions are connected to each other.

14. An information processing apparatus comprising:
a non-transitory memory; and
a processor coupled to the non-transitory memory, which executes the following:
obtaining from a log file log data including a plurality of position data and a plurality of corresponding time data;
obtaining from an image file position data indicating where an image was captured and corresponding time data recorded together with image data; and
selectively creating a first locus by serially connecting the plurality of position data obtained from the log file based on the corresponding time data obtained from the log file, or a second locus by serially connecting both of the plurality of position data and the position data obtained from both of the log file and the image file based on the time data obtained from both of the log file and the image file.

15. A control method for an information processing apparatus using a non-transitory memory and a processor coupled to the non-transitory memory, the control method comprising:

receiving log data containing a plurality of position data and a plurality of corresponding time data, and receiving image data with which position data indicating an image capturing position and time data indicating an image capturing time are associated;

creating a locus by serially connecting the plurality of position data contained in the log data based on the time data contained in the log data;

correcting the locus by serially connecting the position data associated with the image data and the plurality of position data contained in the log data based on the time data associated with the image data and the time data contained in the log data so that the corrected locus shows a more precise route than the locus created based only on the log data; and displaying the corrected locus on a display unit.

16. A control method for an information processing apparatus using a non-transitory memory and a processor coupled to the non-transitory memory, the control method comprising:

obtaining from a log file log data including a plurality of position data and a plurality of corresponding time data;

obtaining from an image file position data indicating where an image was captured and corresponding time data recorded together with image data; and selectively creating a first locus by serially connecting the plurality of position data obtained from the log file based on the corresponding time data obtained from the log file, or a second locus by serially connecting both of the plurality of position data and the position data obtained from both of the log file and the image file based on the time data obtained from both of the log file and the image file.

17. A non-transitory computer-readable storage medium storing a program that when executed causes a computer to perform a control method for an information processing apparatus, the control method comprising:

receiving log data containing a plurality of position data and a plurality of corresponding time data;

receiving image data with which position data indicating an image capturing position and time data indicating an image capturing time are associated;

creating a locus by serially connecting the plurality of position data contained in the log data based on the time data contained in the log data;

correcting the locus by serially connecting the position data associated with the image data and the position data contained in the log data based on the time data associated with the image data and the time data contained in the log data so that the corrected locus shows a more precise route than the locus created based only on the log data; and displaying the corrected locus on a display unit.

18. A non-transitory computer-readable storage medium storing a program that when executed causes a computer to perform a control method for an information processing apparatus, the control method comprising:

obtaining from a log file log data including a plurality of position data and a plurality of corresponding time data;

obtaining from an image file position data indicating where an image was captured and corresponding time data recorded together with image data; and selectively creating a first locus by serially connecting the plurality of position data obtained from the log file based on the corresponding time data obtained from the log file, or a second locus by serially connecting both of the plurality of position data and the position data obtained from both of the log file and the image file based on the time data obtained from both of the log file and the image file.

* * * * *